United States Patent [19]

Quinn

[11] 3,841,570

[45] Oct. 15, 1974

[54] CRUSHING PLANT

[76] Inventor: John N. Quinn, 3979 S. Plymouth Cir., Madison, Wis. 53704

[22] Filed: Dec. 21, 1972

[21] Appl. No.: 317,151

[52] U.S. Cl.................. 241/78, 241/80, 241/101.7, 241/152 A
[51] Int. Cl. ......................... B02c 21/02, B07b 1/28
[58] Field of Search ............................ 241/76–79, 241/79.2, 101.7, 152 A, 152 R

[56] References Cited
UNITED STATES PATENTS
3,622,089   11/1971   Quinn ............................. 241/76 X OTHER PUBLICATIONS
Hewitt–Robins, Inc., Apache Twin Brochure, Copyright Hewitt–Robins, Inc., 1966, 4 sheets.

*Primary Examiner*—Roy Lake
*Assistant Examiner*—E. F. Desmond

[57] ABSTRACT

An elongated gravel crushing plant comprising portable lengthwise adjacent first and second reduction sections each having a material receiving and classifying unit at its rear and crushing means located forwardly of said unit. A delivery conveyor under the crushing means on each section extends forwardly and upwardly therefrom. The conveyor on the first section feeds crushed materials into the material receiving and classifying unit on the second section, and the delivery conveyor on the second section discharges the final product of the two sections at a high level discharge zone at the front of the plant. Crushed materials of different size classifications can be withdrawn from the plant at a multiplicity of stations thereon rearwardly of the final product discharge zone.

30 Claims, 11 Drawing Figures

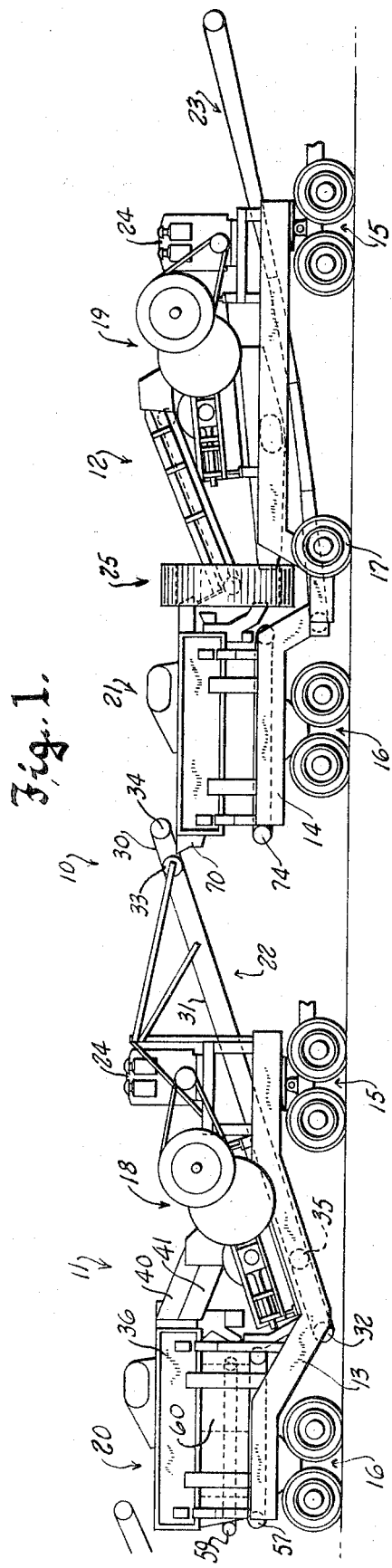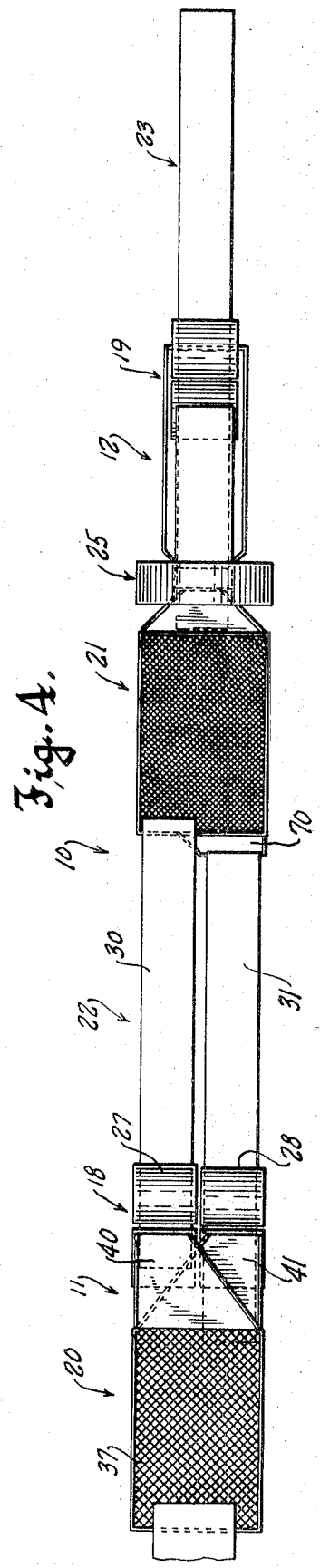

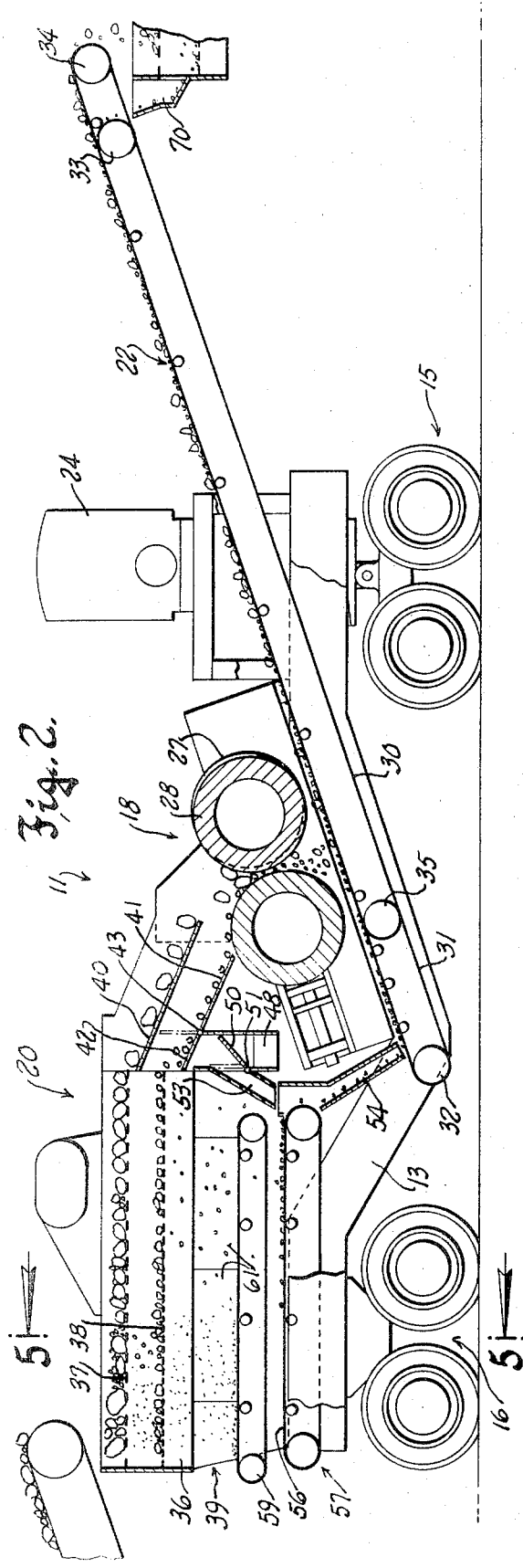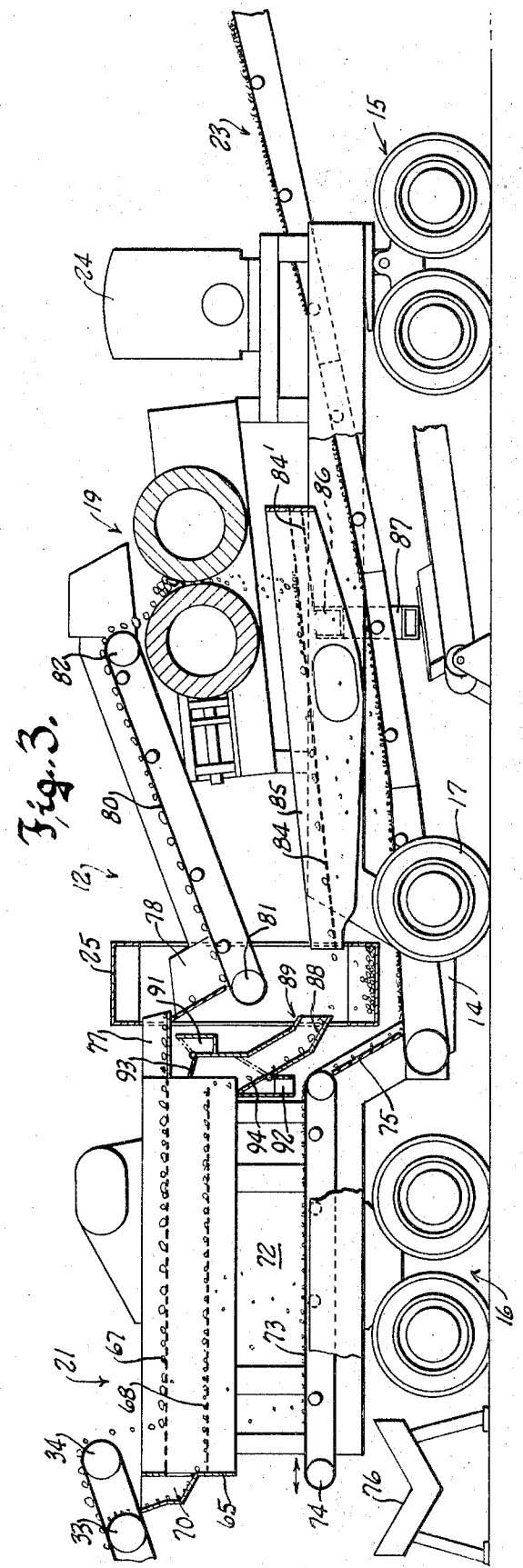

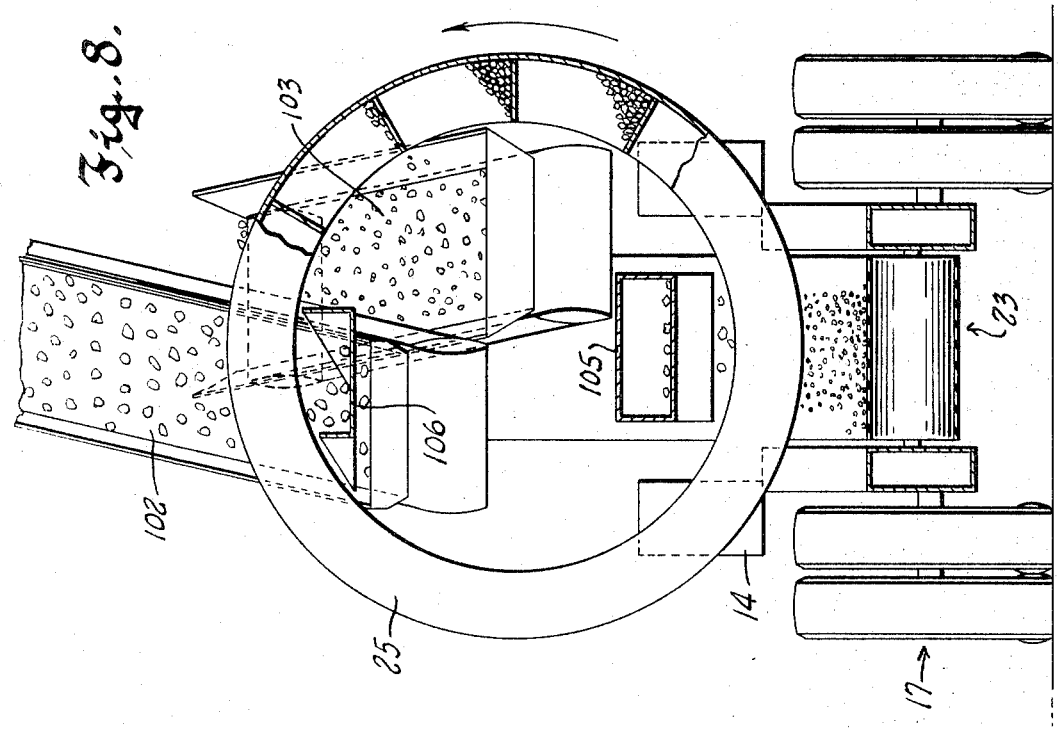
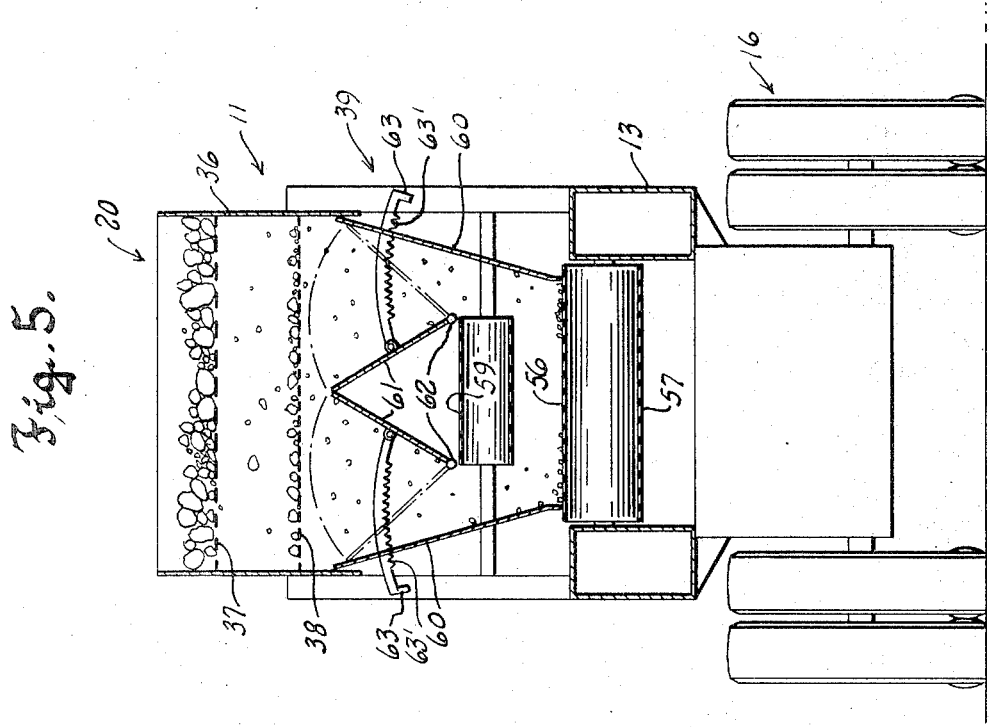

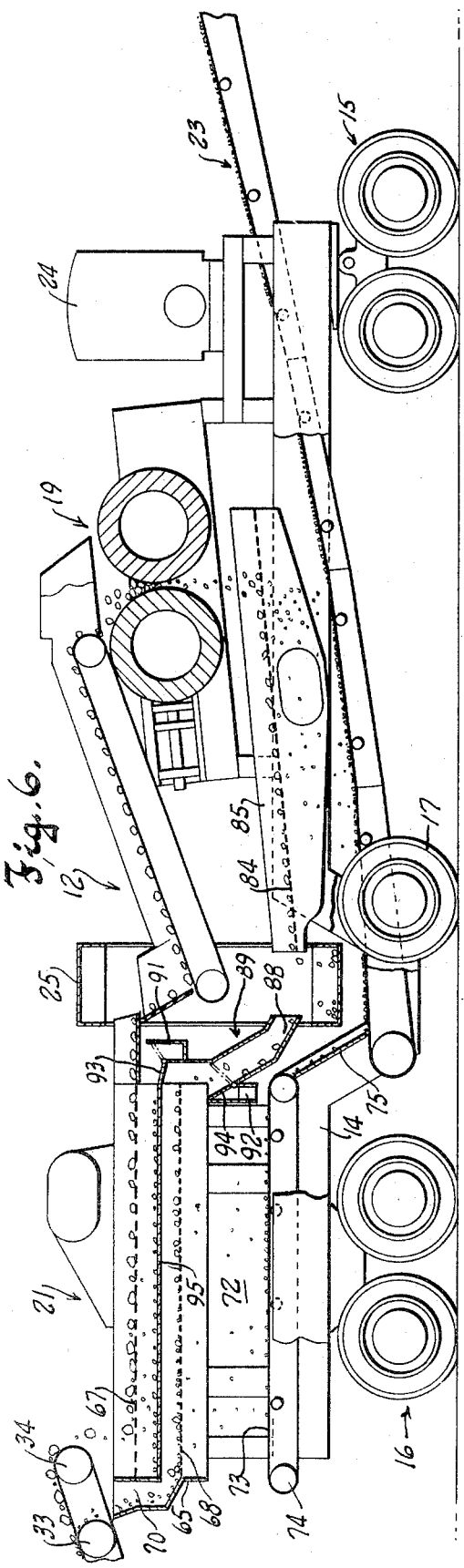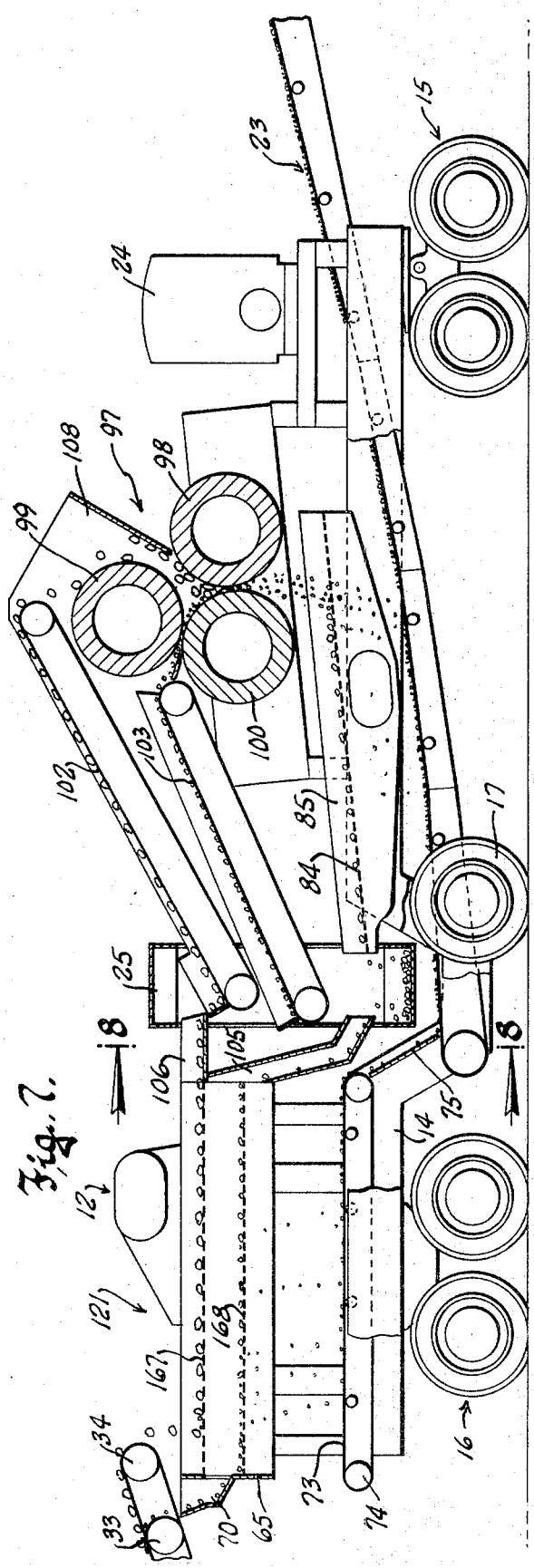

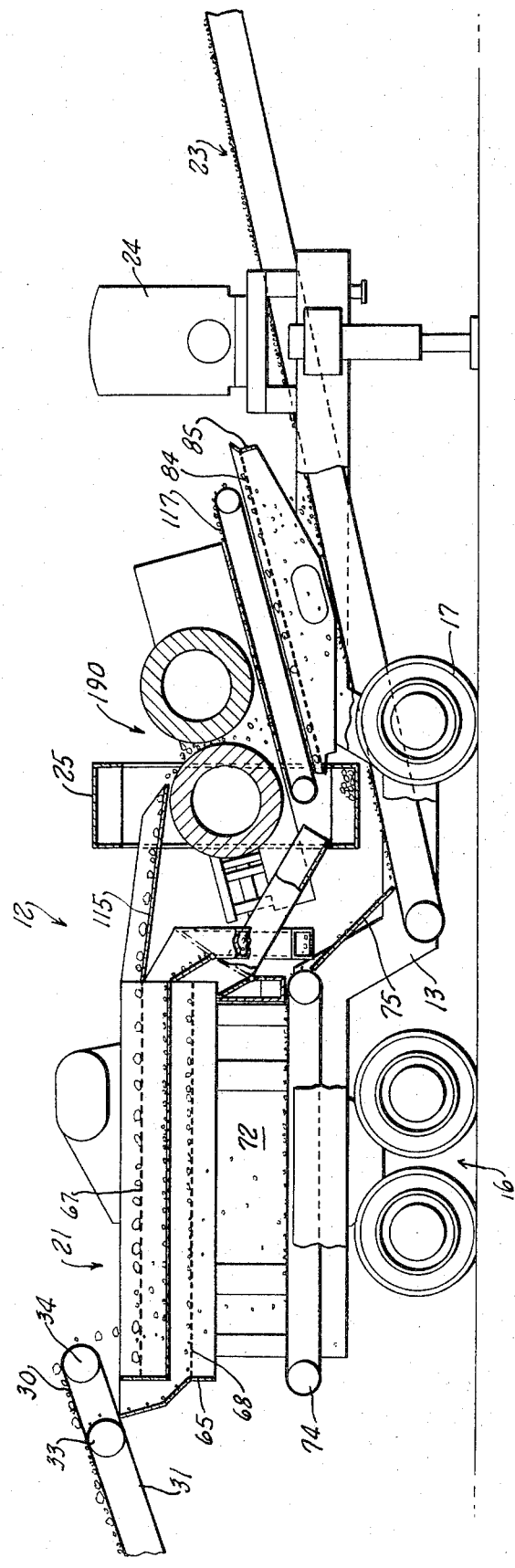

CRUSHING PLANT

This invention relates to crushing apparatus and has more particular reference to plants for crushing or processing gravel.

One of the shortcomings of gravel crushing plants in use in the past is that their output was mainly limited to gravel of only a very small number of product sizes. In most cases all that they were able to produce was the finish or specification size product, along with the so-called fines (sand and dust) which were separated from the material being processed and frequently discarded.

With that objection in mind, it is the main purpose of this invention to provide a gravel crushing plant capable of yielding products of many different sizes at a corresponding number of delivery stations along the length of the plant during operation thereof.

More specifically, it is an object of this invention to provide a gravel crushing plant featuring greater numbers of reduction and classification stages than were customary in the past, and by which the production and withdrawal of produuct of many different size gradations is made possible while the plant is in operation.

Another purpose of this invention resides in the provision of a gravel crushing plant which can be comprised of a pair of lengthwise adjacent first and second reduction sections, each of which is mounted on its own chassis for the sake of portability.

In general, however, it is an object of the invention to provide crushing apparatus of the character described wherein one plant will yield crushed materials of a large number of different product sizes without any need for adjustment of its crushing components or replacement of its screening elements.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate complete examples of several embodiments of the invention constructed according to the best modes so far devised for the practical application of the principles thereof, and in which:

FIG. 1 is a side elevation of a crushing plant constructed in accordance with this invention;

FIGS. 2 and 3 are enlarged more or less diagrammatic views, in longitudinal section, of the rear and front reduction sections, respectively, comprising the plant seen in FIG. 1;

FIG. 4 is a more or less diagrammatic plan view of the plant seen in FIG. 1;

FIG. 5 is a cross sectional view taken through the hopper under the receiving unit of the rear section, on the plane of the line 5—5 in FIG. 2;

FIG. 6 is a view similar to FIG. 3, but showing a front reduction section of slightly modified form.

FIG. 7 is a view similar to FIG. 3 but showing a further modification of the invention;

FIG. 8 is a cross sectional view taken on the line 8—8 of FIG. 7;

FIG. 9 is a view on the order of FIG. 3, but illustrating another modification of the invention.

Figure 10:
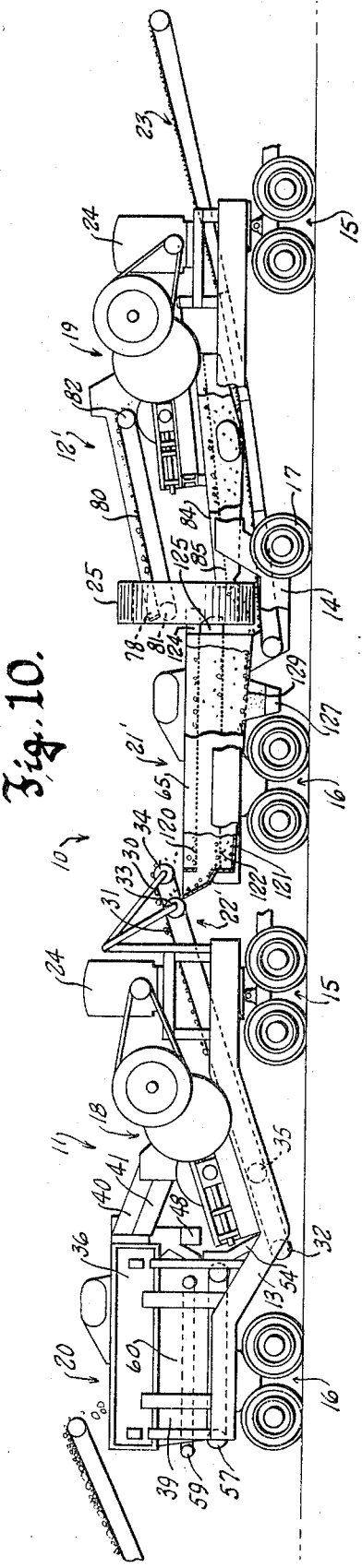
FIGS. 10 and 11 are side elevational views of modified embodiments of the invention.

Referring now more particularly to the accompanying drawings, the numeral 10 generally designates a crushing plant shown as comprising cooperating elongated rear and front crushing or reducing sections 11 and 12, respectively; although all of the components of the plant could as well be mounted on a single frame structure. Inasmuch as the material to be processed ordinarily passes serially through the rear and front reducing sections, they will be hereinafter referred to as the first and second sections 11 and 12, for convenience in describing the same.

As seen, the first and second sections 11 and 12 are aligned lengthwise and are provided with their own supporting structures 13 and 14, respectively. Each supporting structure is equipped with sets of front and rear wheels 15 and 16, respectively, to render the sections easily portable. Inasmuch as the second section 12 is somewhat longer than the rear section, it is provided with an intermediate set of supporting wheels 17.

In general, the plant may be said to comprise crushing devices 18 and 19 located at rear and front reducing stations, respectively, and each driven by a prime mover 24 forwardly adjacent thereto; material receiving and classifying units 20 and 21 mounted on the plant behind the crushing devices 18 and 19 respectively; and rear and front conveyor means 22 and 23, respectively, of the endless belt type.

The conveyor means 22 on the first reduction section has its rear portion adjacent to the front of the receiving unit 20, and it extends upwardly and forwardly under the rear crushing device 18, to have its delivery end portion above and in feeding relation to the receiving and classifying unit 21 on the second reduction section 12. The conveyor means 23 on the second section 12 can be considered as a main product delivery conveyor which carries the main product to a high level discharge zone at the front of the plant. It extends under the front crushing device 19 to receive crushed materials of finish size therefrom, and its rear end portion is located at a low level beneath the front of the material and classifying unit 21 on the second section 12.

An elevator 25, here shown as of the rotary type, is mounted on the second section directly ahead of the receiving unit 21 thereon for rotation on a horizontal axis lengthwise of the plant. In that location, the elevator is disposed between the crushing device 19 and the material receiving and classifying unit 21, but closer to the latter.

One of the features of the crushing plant of this invention resides in the fact that its rear crushing device 18 is provided with two reducing stages. This is to say that it comprises a primary crusher 27 and a secondary crusher 28. If desired, the crushing device 18 can be of the twin dual roll type, as illustrated, and its crushers are arranged laterally adjacent to one another. However, other types of crushers having primary and secondary stages would also suffice.

According to this invention, the rear conveyor means 22 is comprised of a pair of laterally adjacent belt conveyors 30 and 31. The conveyor 30 is positioned to receive only crushed material discharging from the primary crusher 27; while provision is made for its companion conveyor 31 to receive the crushed material issuing from the secondary crusher 28 and to also receive some of the material discharging from the rear material receiving and classifying unit 20.

For that reason, the tail roll 32 of the belt conveyor 31 is located closely adjacent to the front of the material receiving and classifying unit 20, and a distance therebelow. The head roll 33 of the conveyor 31, however, is located a distance rearwardly of the head roll 34 of the adjacent conveyor 30, for a purpose to be later discussed. Similarly, the tail roll 35 of the conveyor 30 is located a distance forwardly of the tail roll 32 of the conveyor 31, but rearwardly of the primary crusher 27.

The material receiving and classifying unit 20 comprises a vibratory device 36 on the order of that illustrated in the Quinn U.S. Pat. No. 3,073,536 of Jan. 15, 1963, having superimposed upper and lower screen decks 37 and 38, respectively, and a hopper 39 mounted on the rear of the supporting structure 13, directly under the unit 20, to receive material that passes through both screen decks 37 and 38 thereof.

The upper screen deck 37 has the coarser mesh, and it is adapted to vibrationally advance scalped or carryover material thereon forwardly to a discharge zone at the front of the unit 20, where the material discharges into a chute 40. The chute 40 directs such material forward and laterally toward one side of the plant, into the inlet of the primary stage 27 of the crushing device 18.

The lower screen deck 38 has smaller mesh, and it is also adapted to vibrationally advance scalped or carryover material thereon forwardly to a discharge zone at the front of the unit 20. In this case, however, such material discharges from the screen deck 38 into a chute 41. The chute 41 normally directs the material forwardly and laterally toward the opposite side of the plant, and into the inlet of the secondary crusher 28 of the rear crushing device 18.

The chute 41 has a movable bottom portion 42 upon which materials fall as they are discharged from the forward end of the lower screen deck 38. This movable bottom portion 42 can comprise a gate which is mounted on the chute 41 for up and down swinging motion about a transverse horizontal pivot 43 spaced from the front of the unit 20. The gate can be held in a first position at which it extends rearwardly from the pivot 43, substantially in coplanar relationship with the bottom of the chute 41, to direct carryover materials from the screen deck 38 into the chute 41.

The gate can be swung in the clockwise direction out of its solid line position seen in FIG. 2, to an upright second position seen in broken lines, to diver material discharging from screen 38 downwardly into a vertically disposed delivery chute 48 which opens laterally toward one side of the plant to a product delivery zone thereat. The coarsest ones of the several products produced by the plant can be collected at this zone in this last described position of the gate 42.

A second gate 50 mounted in the delivery chute 48 can be swung about a transverse pivot 51 at the rear side of said chute from a vertical position seen in construction lines to a forwardly tilted position illustrated in solid lines to divert material entering the delivery chute 48 into another chute 53. The chute 53 opens downwardly and rearwardly into still another chute 54 through which material can flow onto the rear portion of the conveyor 31 that runs under the secondary crusher 28.

It will be appreciated that the gate 50 can be disposed in any of a number of positions intermediate those described to allow selected parts of the material entering the chute 48 to pass simultaneously through both chutes 48 and 53, in whatever proportions are desired.

The hopper 39 under the vibrating screen unit 20 is open at its top to receive materials passing through the screen decks 37 and 38. Its bottom, however, is defined by the upper stretch 56 of an endless belt conveyor 57 which extends fore and aft of the first reduction section 11. The conveyor 57 is driven by any suitable means, but in a direction such that its upper stretch travels in the forward direction so as to discharge material thereon into the chute 54. Hence, so-called fines and any final size material which passes through the mesh of both screen decks 37 and 38 can be deposited on the upper stretch 56 of the conveyor and discharged onto the delivery conveyor 31 which runs under the secondary crusher 28, to be conducted thereby to the receiving unit 21 of the second reduction stage 12.

Alternatively, all or any part of the fines and final product material passing through the two screen decks 37 and 38 can be conducted to another product delivery zone at the rear of the plant. For this purpose, an endless belt conveyor 59 is mounted in the interior of the hopper 39, above the conveyor 57. The upper conveyor 59 is narrower than the lower conveyor 57, and its opposite sides are spaced from the opposite side walls 60 of the hopper so that material can bypass it and fall onto the lower conveyor (see FIG. 5).

While the lower conveyor 57 is always driven so that its upper stretch travels forwardly, the upper conveyor is always driven so that its upper stretch travels rearwardly, to discharge materials thereon at the back of the first reduction section 11.

Again referring to FIG. 5, it will be seen that all of the material passing downwardly through the screen decks 37 and 38 of the receiving unit 20 will bypass the upper conveyor 59 at times when upright gates 61 mounted on fixed pivots 62 at opposite sides of the upper conveyor are in their solid line upwardly convergent positions shown. In that position, the gates form what can be termed a steeply sloped roof over the upper conveyor 59, to deflect all the materials descending toward its upper stretch outwardly and downwardly past the opposite sides of the conveyor. The opposite side walls 60 of the hopper are slanted inwardly so as to direct such materials onto the upper stretch of the lower conveyor 56.

If the gates 61 are swung outwardly away from one another to their broken line positions seen in FIG. 5, at which their upper edges rest against the side walls 60 of the hopper, all of the material passing through the mesh of the two screen decks 37 and 38 will be directed onto the upper conveyor 59.

It is a feature of this invention, however, that a plurality of longitudinally adjacent gates 61 are provided at each side of the conveyor 59. Accordingly, all of the gates can be disposed in either of the two positions described; or one pair of opposite gates can be in their solid line positions, for example, and others in their broken line positions. This enables any selected part of the material passing through the mesh of both screen decks 37 and 38 to be deposited on the upper conveyor 59, and the remainder to be deposited on the lower conveyor 56.

Thus, for example, if the mesh of the rear one-half of the lower screen deck 38 is made smaller than that of its front half, fines and dust can pass through it and the spread apart rear gates 61 to drop onto the upper conveyor 59 and be discharged to the rear of the plant, while somewhat coarser materials, including those of final product size, can be made to bypass the upper conveyor and be deflected by gates 61 in their upwardly convergent position onto the lower conveyor 56 for discharge onto the delivery conveyor 31 under the secondary crusher 28.

In this way, separation of the fines and final size materials can be effected at the input station containing the receiving unit 20, to thus minimize the handling of the material by the various components of the apparatus.

It is also a feature of this invention that the gates 61 can be held in any of a number of positions intermediate their two extreme portions described, by means of latch type handles 63 which project outwardly therefrom through slits in the side walls 60 of the hopper. Teeth 63' on these handles can engage the bottom edges of the slits through which the handles project to latch the gates in the desired positions of adjustment.

The two side by side conveyors 30 and 31 carry materials discharged thereonto upwardly and forwardly to separate discharge zones adjacent to the upper rear portion of the material receiving and classifying unit 21 on the second reduction unit 12. The forward material receiving and classifying unit 21 is similar to the rear unit 20 in that it also comprises a vibratory screen device 65 mounted at an upper level on the rear of the supporting structure 14, and contains upper and lower screen decks 67 and 68, respectively. Again in this case, the mesh of the upper deck screen is coarser than that of the lower deck screen.

As stated earlier, the conveyor 30 receives crushed material from the primary stage of the crushing device 18 and extends a distance forwardly beyond its laterally adjacent companion conveyor 31. The purpose of this is to position the head roll 34 of the conveyor 30 over the top rear portion of the material receiving and classifying unit 21, so that material discharging from said conveyor will fall onto the upper screen deck 67.

The head roll 33 of the companion conveyor 31 terminates short of the rear of the material receiving and classifying unit 21 and discharges material into a chute 70 on the back of said unit arranged to debouch onto the lower screen deck 68. Hence, the upper screen deck 67 receives the coarser crushed material from the output of the primary stage of the crushing device 18, while the lower screen deck 68 receives somewhat finer material from the secondary stage of said crushing device, along with any other material fed onto the rear end portion of the conveyor 31 from the rear material receiving and classifying unit 20.

During operation, vibration of the upper and lower screen decks 67 and 68 is relied upon to carry scalped material thereon forwardly to discharge zones at the front of the unit 21; while material fine enough to be classified as main product passes through the mesh of both screen decks to fall into a hopper-like structure 72 mounted on the supporting structure 14 under the unit 21. The material thus received in the hopper-like structure 72 drops onto the upper stretch 73 of an endless belt conveyor 74 mounted on the supporting framework 14 at the open bottom of the hopper-like structure.

The conveyor 74 can be driven in either direction, as by a reversible motor, so that materials on its upper stretch can be carried to and discharged from either the front or the rear end of the material receiving and classifying unit 21. When the conveyor is driven in a direction such that its upper stretch travels in the forward direction, the materials thereon will be discharged into a chute 75 oriented to direct the materials onto the rear end portion of the main product delivery conveyor 23 mentioned earlier. However, when the conveyor 74 is driven in the reverse direction, the materials on its upper stretch will be discharged rearwardly into a trough 76 or other delivery means by which they can be conducted laterally to a product collecting zone at one side of the plant.

The coarser crushed material which fails to pass through the mesh of the upper screen deck 67 is vibrationally advanced thereby to a chute 77, which directs the material into a receiver 78 carried by the supporting framework of an endless belt conveyor 80. This conveyor extends upwardly and forwardly from its tail roll 81, which is located inside the rotary elevator 25 and substantially on its axis of rotation. Its head roll 82 is located upwardly adjacent to the inlet of the secondary crushing device 19, so that materials fed into the receiver 78 will be carried upwardly and forwardly on the top stretch of the conveyor 80 and discharged into the secondary crushing device 19 for further reduction. The secondary crushing device 19 can be of any suitable type, but is here illustrated as being of the roll type.

It is significant to note that the transfer of materials from the chute 77 to the receiver 78 on the rear of the feed conveyor for the secondary crushing device 19 takes place in the interior of the rotary elevator 25. Hence, any materials which are fed into the elevator at a low level inlet zone thereof are carried upwardly thereby to a high level discharge zone to be also loaded into the receiver 78 and fed into the secondary crushing device for further reduction, along with the materials transferred to the conveyor from the upper screen deck 67.

Crushed material issuing from the secondary crushing device 19 drops downwardly onto the single screen deck 84 of a vibratory screen unit 85. The mesh of the screen deck 84 is such as to pass all materials of final product size, and to vibrationally carry all materials which fail to pass therethrough rearwardly toward and into the inlet zone of the elevator wheel 25. In this way, materials of greater than the desired main product size are recirculated through the secondary crushing device to assure reduction to the proper size; while materials of final product size passing through the screen deck 84 drop onto the main product delivery conveyor 23 for a discharge from a high level delivery zone at the front of the plant.

If desired, some of the stone chips that pass through the screen 84 can be intercepted by a short length of screen 84' in the forward portion of the vibratory unit 85, under the discharge of the secondary crushing device 19. Like the screen 84 above it, the screen 84' also slopes downwardly and rearwardly, and it is arranged to discharge through opposite holes 86 in the sides of the vibratory unit 85. These holes lead into the two branches of a bifurcated delivery chute 87 which embraces the conveyor 23 and discharges downwardly onto a conveyor or the like that conducts the chips to some location at one side of the machine.

Some or all of the materials which fail to pass through the mesh of the lower screen deck 68 on the receiving and classifying unit 21 can be discharged from the forward end of said deck into the low level inlet zone of the elevator wheel 25 through what can be termed the center chute 88 of a triple branched chute structure generally designated 89. Such materials will be elevated by the wheel 25 and discharged onto the feed conveyor 80 for the secondary crushing device 19, to undergo further reduction therein.

The triple branched chute structure 89 also comprises front and rear chutes 91 and 92, respectively, which are oriented to discharge materials passing therethrough laterally to delivery zones at the side of the plant; and valve-like upper and lower gates 93 and 94, respectively. The transfer of carryover materials on the lower screen deck 68 to the elevator wheel 25 via the center chute 88 requires the gate 94 to be placed in its left hand position shown, closing off the entrance to the chute 92. The position of gate 93 is not important at this time and it can occupy its downwardly extending position seen.

When the lower gate 94 is moved to its righthand position indicated by construction lines, it closes off the entrance to the chute 88 and directs to the rear chute 92 all of the carryover material discharging over the forward end of the lower screen deck 68. The gate 94, of course, can also be placed in any of a number of intermediate positions if only selected fractions of the carryover material discharging from the lower screen deck are to be directed through the chute 92 to a product collecting zone at one side of the plant.

The upper gate 93 is only placed in a substantially horizontal position when an imperforate plate 95, such as seen in FIG. 6, is mounted in the material receiving and classifying unit 21 at a level between those of the screen decks 67 and 68. In that position, the plate 95 will intercept all of the material passing through the mesh of the upper screen deck 67, and it will vibrationally advance the same to a discharge zone at the front edge of the plate, where such material can travel across the gate 93 and into the front chute 91 for discharge to product collecting means at one side of the plant.

In the FIG. 6 embodiment of the invention, both screens 67 and 68 can have the same size mesh, in which case, the carryover material on both will be fed into the secondary crushing device 19 via the conveyor 80. The carryover material from the lower screen 68, of course, reaches the conveyor 80 via the elevator wheel 25. The advantage of the arrangement seen in FIG. 6 is that the screens 67 and 68 afford the same screening capacity (in terms of length) as could only be obtained in a receiving unit 21 twice the length of that shown.

According to that embodiment of the invention seen in FIG. 7, the crushing device on the second reduction section 12 can also have primary and secondary stages such as are provided in a triple roll crusher 97. The triple roll crusher has coarse first and fine second stage crushing rolls 98 and 99 respectively, cooperating with a common crushing roll 100.

The first and second stage crushers 98 and 99 are fed materials to be crushed by means of separate upper and lower conveyors 102 and 103, respectively. The rear portions of these conveyors diverge and extend into the elevator wheel 25 to be located near opposite sides of the wheel, as seen in FIG. 8. It is possible, of course, to eliminate the upper conveyor 102 if the first and second stage crushers are reversed and fed entirely from the conveyor 103.

The wheel is rotated in the counter-clockwise direction as indicated by the arrow in FIG. 8, so that materials elevated thereby will discharge onto the rear portion of the lower conveyor 103 and be carried upwardly and forwardly thereby into the bite of the second stage rolls 99 and 100. The materials thus deposited on the lower conveyor are those which are fed into the low level charging zone of the elevator wheel from the lower screen deck 168 of the material receiving unit 121 on the rear of the second reducing section 12. The carryover materials discharging over the forward end of the screen deck 168 are directed into the elevator wheel by means of a chute 105. If desired, the chute 105 can be arranged to discharge directly onto the rear of the lower conveyor 103.

Carryover materials on the upper deck screen 167 discharging over the forward end of the latter are directed onto the rear portion of the upper conveyor 102 by means of a chute 106. This chute is angled toward that side of the elevator wheel containing the rear of the conveyor 102.

The conveyor 102 extends upwardly over the top roll 99 of the triple roll crusher and discharges into a hopper-like structure 108 that directs the material into the bite of the first stage rolls 98 and 100. All of the crushed material issuing from the triple roll crusher falls onto the screen 84 of a vibratory screen unit 85 like that seen in the FIG. 3 embodiment of the invention; and the final product will pass through the screen 84 onto the delivery conveyor means while carryover material larger than the desired main product size will be vibrationally conducted back into the elevator wheel for recirculation through the second stage crushing rolls 99, 100.

By proper selection of screen mesh in the receiving and classifying units 20 and 21, it will be seen that crushed products of different size graduations can be discharged from the plant at delivery stations located at various points along the length of the plant. Thus, the finest and the coarsest materials can be discharged at stations at the rear and the front, respectively, of the material receiving and classifying unit on the rear reducing section 11. The finest of sand materials can be collected at the rear of the conveyor 59 while the coarsest materials are those which are caused to discharge laterally from the chute 48.

Five more product delivery stations are located at various points on the forward reducing section 12; one at the trough 76 behind the conveyor 74; a second at the discharge end of the chute 92; a third at the discharge end of the chute 91; a fourth at the chip spout 87; and the fifth at the forward end of the main product conveyor 23.

If the fines consisting of sand, dust and the like are to be rejected, a fine mesh screen section is installed in the rear portion of the lower screen deck 38 on the receiving unit 20, and the gates 62 therebeneath are opened to direct the fines into the upper conveyor 59 for discharge at the rear of the plant.

Otherwise, all of the material being processed can be passed through the plant to be discharged from the upper end of the main product conveyor 23; or any part thereof can be gathered at one or more of the delivery stations mentioned above.

That embodiment of the invention seen in FIG. 9 illustrates the versatility of the apparatus, especially the receiving and classifying units thereof which can be used with crushers other than those described thus far. For example, a receiving and classifying unit 21 such as seen in FIG. 6 can feed any of a number of different secondary crushing devices, one of which as indicated at 190, can comprise a compact unit located partly in the interior of the elevator wheel 25.

In this case, carryover material on the upper deck screen 67 will be conducted to a chute 115 at its forward end. The chute 115 extends into the interior of the elevator wheel 25 and discharges into the inlet of the crushing device 190, here illustrated as a conventional roll crusher driven by the forward engine 24.

Also, the vibratory screen unit 85 is located beneath a belt conveyor 117 between it and the underside of the roll crusher 190. The conveyor 117 carries crushed materials issuing from the roll crusher upwardly and forwardly, and discharges the same onto the forward end portion of the screen 84 in the screen unit 85. As before, carryover materials on the screen 84 are brought back into the elevator to be recirculated through the crusher 190; materials of final product size, of course, pass through the screen 84 and drop onto the delivery conveyor 23.

Figure 11:
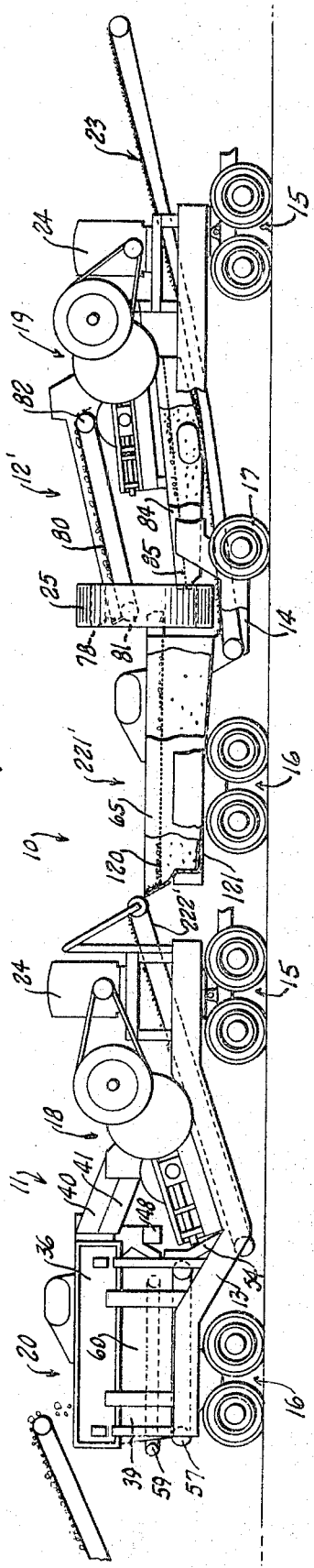

FIGS. 10 and 11 illustrate embodiments of the invention which feature significant savings in plant costs as a result of substantial reductions in the size and proportions of certain of the components of the apparatus.

For example, FIG. 10 shows how the first and second reduction sections of a crushing plant like that of FIG. 1 can be operatively disposed in exceptionally close end to end relationship. This is made possible primarily by providing the front reduction section 12' with a substantially squat material receiving and classifying unit 21' to thereby allow the rear conveyor means 22' which feeds material thereinto to be significantly shortened.

The material receiving and classifying unit 21' is of the vibratory type, as before, and it is provided with spaced top and bottom decks 120 and 121, respectively, and an intermediate deck 122. It projects such a slight distance above the supporting framework 14 of the front reduction section 12 that its top deck 120, which is a screen, is at a level well below the axis of rotation of the rotary elevator 25 ahead of it. The intermediate deck 122 is also a screen, and it is located at a level beneath the top of the supporting framework 14. The bottom deck 121 in this case comprises a carrying pan which is located below the level of the supporting framework 14 and is inclined downwardly and forwardly, toward the rear of the delivery conveyor 23. With this arrangement, materials that pass through the screens 120 and 122 are received on the pan 121 and are vibrationally carried forwardly thereby to be discharged onto the delivery conveyor 23.

The top screen deck 120 discharges carryover material vibrationally advanced in the forward direction thereby into the elevator 25, and a chute 124 facilitates transfer of such materials into the elevator. A chute 125 at the front end of the lower screen 122 also facilitates discharge into the elevator of carryover material vibrationally advanced in the forward direction by the screen 122.

The remainder of the front reduction section of FIG. 10 is substantially the same as that described in connection with the FIG. 1 embodiment of the invention. It should be noted, however, that wherever desired, the front reduction section of FIG. 10 can be optionally provided with the chip intercepting screen 84' and discharge chute 87 for the intercepted chips, as in the FIG. 3 embodiment of the invention. Another optional feature that can be incorporated in the front reduction section 12' resides in the provision of a sand reject chute 127 under a hole in the carrying pan 121 near its forward end, to receive sand and pulverulent materials which are not desired in the final product. A short screen 129 is preferably disposed under the lower screen deck 122 and over the entrance to the chute 127 in this case. The screen 129 intercepts crushed materials of final product size that pass through the forward portion of the screen 122 and vibrationally advances such intercepted materials in the forward direction for discharge onto that portion of the carrying pan 121 which is forwardly of the sand reject chute 127 and the entrance thereto.

A chute structure on the order of that seen in FIG. 3 can also be used at the front end of the receiving and classifying unit 21' for the purpose of providing for side discharge at a product delivery zone of carryover materials advanced to the front end of the lower screen deck 122 when desired.

It will also be apparent that a receiving and classifying unit 21' such as described above could be used to advantage in the front reduction section 12 seen in FIG. 7, regardless of whether the first and second stage crushers therein disclosed are of the triple roll type or of the twin dual roll type. In the latter event, of course, the feed conveyors for the two stage crusher could be arranged in the same side by side relation as the laterally disposed stages of a twin dual roll crusher.

The FIG. 11 embodiment of the invention illustrates a front reduction section like that seen in FIG. 10 operatively close coupled as before to the forward end of a rear reduction section having only one primary crushing stage and one conveyor 222 to feed the forward reduction section. In this case, however, the receiving and classifying unit 221, which is fed from the conveyor 222, has one screen deck 120 at its top, a carrying pan 121 at its bottom, and no screen member at the intermediate level. Hence, all of the crushed materials that pass through the screen 120 drop onto the carrying pan 121 and are conducted thereby to the rear of the delivery conveyor unless, of course, a sand reject opening and chute is provided in the bottom of the pan as previously described.

It will be appreciated, of course, that a belt conveyor 73 such as that seen in FIG. 3 can be used in the lower portion of the material receiving unit 221', to conduct the finish size material passing through the screen deck 120 to the delivery conveyor. Likewise, the screen deck 120 could be elevated somewhat and advantageously arranged to discharge directly onto the rear of the feed conveyor 80.

From the foregoing description, together with the accompanying drawings, it will be apparent to those skilled in the art that this invention provides a gravel crushing plant featuring versatility with regard to the production of products of several different size graduations.

I claim:

1. An elongated crushing plant having crushing means located at front and rear stations, rear conveyor means extending upwardly and forwardly from the underside of the crushing means at said rear station, and a delivery conveyor extending forwardly and upwardly from the underside of the crushing means at said front station, characterized by:
   A. the crushing means at the rear station comprising primary and secondary crushers;
   B. a material receiving and classifying unit located between said stations and having means thereon for producing a plurality of outputs each consisting of graded material differing in size from the others;
   C. said rear conveyor means conducting crushed material from said rear crushing station to said material receiving and classifying unit and comprising first and second conveyors having rear portions disposed to receive crushed materials issuing from said primary and secondary crushers, respectively;
   D. means for conducting output material of finish grade from said material receiving and classifying unit to said delivery conveyor;
   E. means comprising a conveyor member for conducting output material of a grade larger than finish grade from the receiving and classifying unit to the crushing means at said front station;
   F. an elevator to receive materials at a low level inlet and to discharge the same onto said conveyor member from a high level zone;
   G. means for directing output material of a grade intermediate said larger and finish grades to said low level inlet of the elevator;
   H. and means for screening out larger than finish grade material discharging from the crushing means at said front station and for conducting the same into the low level inlet of the elevator.

2. The crushing plant of claim 1, further characterized by:
   A. said crushing means at the front station comprising primary and secondary crushers;
   B. the secondary crusher being fed from said conveyor member;
   C. and a second conveyor member positioned to receive output material of the largest grade from said material receiving and classifying unit and to direct the same into the primary crusher at said front station.

3. The crushing plant of claim 1, further characterized by:
   A. a receiving unit mounted on the plant behind said rear crushing station, to receive input materials to be crushed;
   B. means on said receiving unit for separating the largest size pieces from the input material and for conducting such separated pieces into the primary crusher;
   C. means on said receiving unit for sorting out finish grade material from the input material and for delivering such finish grade material to the rear conveyor means;
   D. and means on said receiving unit for separating from the input material pieces of intermediate grade and for conducting the same into the secondary crusher.

4. The crushing plant of claim 1, further characterized by:
   A. means on the rear of the plant providing a receiving unit for input materials to be crushed;
   B. and means including screen members on said receiving unit for sorting out materials of two different sizes from the input material and for conducting materials of the larger size into the primary crusher and the materials of smaller size into the secondary crusher.

5. An elongated crushing plant having crushing means located at front and rear stations, rear conveyor means extending upwardly and forwardly from the underside of the crushing means at said rear station, and a final product delivery conveyor extending forwardly and upwardly from the underside of the crushing means at said front station, characterized by:
   A. the crushing means at the rear station comprising laterally adjacent primary and secondary crushers;
   B. said rear conveyor means comprising first and second conveyors having laterally adjacent portions beneath said primary and secondary crushers, respectively, to receive crushed materials discharging therefrom;
   C. a conveyor member for feeding materials to be crushed into the crushing means at said front station;
   D. an elevator to receive materials at a low level zone and to discharge the same onto said conveyor member from a high level zone;
   E. a vibratory screen unit behind the elevator, having top and bottom screen decks to receive materials discharging from said first and second conveyors, respectively, and to vibratorily conduct carryover materials thereon to said conveyor member and to said low level elevator zone, respectively, both of said screen decks being adapted to pass materials of final product size;
   F. means positioned under said bottom screen deck to receive and discharge materials of final product size onto said delivery conveyor;
   G. and means mounted between the front crushing means and the delivery conveyor for screening out larger than final product size pieces of the material discharging from the latter and for conducting such screened out material into said low level elevator zone.

6. An elongated crushing plant having at its rear end portion an input station for materials to be crushed, and a crushing station forwardly thereof, characterized by:
   A. laterally adjacent primary and secondary crushers at said crushing station;
   B. laterally adjacent first and second conveyors extending forwardly and upwardly past the crushing station with their lower end portions disposed under the primary and secondary crushers, respectively, to receive crushed materials issuing therefrom and to discharge said materials at a location a distance forwardly of and at an elevation above said crushers;

C. a vibratory material receiving and classifying unit at said input station, having a pair of superimposed screen members,
1. the upper one of said screen members being the coarsest and being adapted to vibrationally advance carryover material thereon to a discharge point at its forward end,
2. and the lower one of said screen members having smaller mesh and being adapted to vibrationally advance carryover materials thereon to a discharge point at its forward end;
D. means for conducting into the primary and secondary crushers scalped materials discharging from said upper and lower screen members, respectively;
E. and means for conducting materials that pass through both screen members onto said second conveyor.

7. The crushing plant of claim 6, wherein said last named means comprises a conveyor member having its discharge end above and rearwardly adjacent to the rear of said second conveyor.

8. The crushing plant of claim 6, further characterized by:
A. upper and lower belt conveyor members extending lengthwise of the plant beneath said receiving and classifying unit;
B. the top stretch of the upper conveyor member being adapted to travel in a rearward direction and to discharge product deposited thereon at the rear of the plant;
C. the top stretch of the lower conveyor member being adapted to travel in a forward direction for discharge of material thereon onto the rear of said second conveyor;
D. and material routing means for directing materials which pass through said lower screen member selectively onto the top stretch of either the upper or the lower conveyor member.

9. The crushing plant of claim 8, further characterized by:
A. a hopper into which material passing through the lower screen member falls;
B. said upper conveyor being mounted in the hopper with its opposite sides in spaced relation to the side walls of the hopper;
C. and wherein said material routing means comprises gate means carried by the hopper for movement from a first position directing all of the material passing through the lower screen member onto the upper conveyor, to a second position directing all of the material passing through the lower screen member onto the lower conveyor.

10. The crushing plant of claim 9, further characterized by means for holding said gate means in a plurality of different positions between said first and second positions thereof, so as to provide for the simultaneous routing of different selected amounts of material onto said upper and lower conveyor members.

11. The crushing plant of claim 6, further characterized by:
A. said means for conducting carryover material discharging from the lower screen member into the secondary crusher comprises a first chute having a gate which can be moved to a position at which said carryover material bypasses the secondary crusher;
B. and a second chute into which said carryover material flows in said bypass position of the gate, for conducting said carryover material onto the rear portion of said second conveyor.

12. The crushing plant of claim 11 further characterized by:
A. a product delivery chute;
B. and another gate movable to a position directing carryover material entering said second chute into the product delivery chute.

13. An elongated crushing plant, comprising the combination of:
A. an elevator to receive material at a low level zone and to discharge said material at a high level zone;
B. crushing means mounted on the plant forwardly adjacent to the elevator;
C. a feed conveyor to conduct into the crushing means material discharged by the elevator;
D. a main product delivery conveyor extending upwardly and forwardly under the crushing means and having its rear portion adjacent to said elevator;
E. a screen member interposed between the delivery conveyor and the underside of the crushing means, to pass material of finish size to the delivery conveyor and to direct materials of larger size to said low level zone of the elevator;
F. a material receiving unit rearwardly adjacent to the elevator having means including a vibratory top screen deck to advance materials of larger than finish size forwardly onto said feed conveyor, said unit having means including a bottom vibratory screen deck beneath said top screen deck to receive materials that pass through the latter and to vibrationally advance materials of larger than finish size forwardly into said low level zone of the elevator;
G. and means mounted beneath said lower screen deck to receive materials of finish size and to conduct the same onto the rear portion of the delivery conveyor.

14. The crushing plant of claim 13, further characterized by:
A. said last named means comprising a belt conveyor the top stretch of which receives materials that pass through said lower screen deck and conducts them forwardly to a discharge zone adjacent to the rear of the elevator when said conveyor is driven in one direction;
B. and said delivery conveyor extending rearwardly under and beyond the elevator to have its rear end portion in position to receive materials leaving said conveyor at said discharge zone.

15. The crushing plant of claim 14, wherein said belt conveyor extends to a product delivery zone at the rear of the plant to there discharge material on its top stretch when said conveyor is driven in the opposite direction.

16. The crushing plant of claim 13, further characterized by a chute structure at the forward end of said bottom screen deck to receive materials discharging therefrom and having a spout to direct such materials forwardly to said low level zone of the elevator.

17. The crushing plant of claim 16, further characterized by:

A. said chute structure having a second spout thereon to direct materials laterally toward a product delivery zone at one side of the plant;
B. and gate means in said chute structure to govern the flow of materials through said spouts.

18. The crushing plant of claim 13, further characterized by:
A. an imperforate vibratory deck which can be removably supported on the material receiving unit at a level between said top and bottom screen decks to receive material passing through the mesh of the top screen deck and vibrationally advance such material forwardly toward a discharge zone at the rear of the elevator;
B. and a chute to receive material discharging from said imperforate deck and to spout the same toward a product delivery station at one side of the plant.

19. The crushing plant of claim 13, further characterized by:
A. said crushing means comprising primary and secondary crushers;
B. said feed conveyor conducting material discharged by the elevator into the secondary crusher;
C. and another feed conveyor to conduct materials into the primary crusher from the top screen deck of the material receiving unit.

20. The crushing plant of claim 19, further characterized by:
A. said primary and secondary crushers being located laterally adjacent to one another;
B. and said feed conveyors extending forwardly to locations adjacent to the inlets of their respective crushers.

21. In a crushing plant, the combination of:
A. an elongated supporting structure having a rearwardly located receiving station for input materials to be processed and a crushing station located forwardly thereof;
B. crushing apparatus at said crushing station, having an inlet in an upper portion and an outlet in a lower portion;
C. a delivery conveyor extending beneath the outlet of the crushing apparatus;
D. means for separating from the input materials those of main product size and for conducting the same to the delivery conveyor;
E. means for separating from the input materials those of larger than main product size and for conducting the same to the inlet of the crushing apparatus;
F. said material separating means comprising a vibratory material receiving unit having upper and lower screens of the same size mesh;
G. said means for conducting separated materials of main product size to the delivery conveyor comprising conveyor means mounted under the lower one of said screens to receive main product size material passing therethrough;
H. feed conveyor means arranged to discharge input materials to be processed separately onto said screens;
I. means for conducting carryover materials on said screens to the inlet of the crushing apparatus;
J. means mounted between the delivery conveyor and the outlet of the crushing apparatus for intercepting crushed material of larger than main product size issuing therefrom while allowing those of main product size to drop onto the delivery conveyor;
K. means for returning such intercepted material to the inlet of the crushing apparatus;
L. said crushing apparatus comprising secondary crushing means;
M. and primary crushing means located a distance rearwardly of said material receiving unit, and arranged to discharge crushed materials onto said feed conveyor means.

22. The crushing plant of claim 21, further characterized by:
A. said primary crushing means comprising first and second stage crushers;
B. and said feed conveyor means comprising a pair of conveyors, one for each of said first and second stage crushers to conduct crushed materials issuing therefrom to said material receiving unit.

23. An elongated crushing plant having crushing means located at spaced front and rear stations, and characterized by:
A. a material receiving and classifying unit at a location between said stations;
B. conveying means for conducting material crushed at said rear station to said material receiving and classifying unit;
C. conveyor means to carry crushed materials of main product size from the crushing means at said front station to a product delivery zone;
D. vibratory means on said receiving and classifying unit for separating from the materials conducted thereto those of larger than main product size;
E. means for conducting such separated larger materials into the crushing means at said front station;
F. and means on said receiving unit for separating from materials fed thereto those of main product size and for conducting the same to the delivery conveyor.

24. The crushing plant of claim 23, wherein said vibratory means comprises a screen; and wherein said last named means comprises a vibratory carrying pan mounted under said screen.

25. An elongated crushing plant, comprising the combination of:
A. an elevator to receive material at a low level zone and to discharge said material at a high level zone;
B. crushing means mounted on the plant forwardly adjacent to the elevator;
C. a feed conveyor to conduct into the crushing means material discharged by the elevator;
D. a main product delivery conveyor extending upwardly and forwardly under the crushing means and having its rear portion adjacent to said elevator;
E. a screen member interposed between the delivery conveyor and the underside of the crushing means, to pass material of finish size to the delivery conveyor and to direct materials of larger size to said low level zone of the elevator;
F. a material receiving unit rearwardly adjacent to the elevator having means including a vibratory screen deck to advance materials of larger than finish size forwardly onto said feed conveyor;

G. and means beneath said screen deck to receive materials of finish size passing therethrough and to conduct the same to the main product delivery conveyor.

26. An elongated crushing plant, characterized by:
A. a secondary crushing device at a forward location, having an inlet at its top and an outlet at its bottom;
B. a delivery conveyor extending under the outlet of the crushing device;
C. an elevator wheel located rearwardly of the crushing device, to receive materials at a low level zone and to discharge said materials at a high level zone;
D. means for conducting to the inlet of the crushing device materials discharging at said high level zone of the elevator;
E. screen means located above the delivery conveyor and in position to intercept larger than main product size materials issuing from the outlet of the crushing device, for directing such intercepted materials to the low level inlet zone of the elevator wheel;
F. a receiving unit located rearwardly of the elevator wheel, having means comprising a vibratory screen on an upper portion thereof to receive input materials to be processed, and on which oversize input materials are vibrationally advanced forwardly to a discharge zone adjacent to the elevator wheel;
G. means to conduct such oversize materials from said discharge zone to the inlet of the crushing device along a path leading through the interior of the elevator wheel;
H. said receiving unit having means including a second vibratory screen below said first designated screen, to intercept larger-than main product size materials but to pass and direct main product size materials to the delivery conveyor;
I. means for conducting such larger materials from said second screen forwardly to the low level inlet zone of the elevator wheel;
J. feed conveyor means for discharging materials to be processed separately onto said screens;
K. means including said elevator wheel for conducting carryover material on said lower screen to the inlet of the crushing device;
L. and primary crushing means located a distance rearwardly of said receiving unit, arranged to discharge materials crushed thereby onto said feed conveyor means.

27. The crushing plant of claim 26, further characterized by:
A. said primary crushing means comprising first and second stage crushers;
B. and said feed conveyor means comprising a pair of conveyors, one for each of said first and second stage crushers to conduct crushed materials issuing therefrom to said vibratory unit.

28. In a crushing plant, the combination of:
A. an elongated supporting structure having a rearwardly located receiving station for input materials to be processed, and crushing stations located forwardly and rearwardly thereof;
B. primary crushing means carried by the supporting structure at the rearward one of said crushing stations;
C. secondary crushing means carried by the supporting structure at the forward one of said crushing stations, and having an inlet in an upper portion and an outlet in a lower portion;
D. a delivery conveyor extending beneath the outlet of the secondary crushing means;
E. feed conveyor means for conducting to the receiving station, input material comprising the crushed materials issuing from the primary crushing means;
F. means for separating from said input materials those of main product size and for conducting the same to the delivery conveyor;
G. means for separating from the input materials those of larger than main product size and for conducting the same to the inlet of the secondary crushing means;
H. means mounted between the delivery conveyor and the outlet of the secondary crushing means for intercepting crushed material of larger than main product size issuing therefrom while allowing those of main product size to drop onto the delivery conveyor;
I. and means for returning such intercepted material to the inlet of the secondary crushing means.

29. In a crushing plant, the combination of:
A. an elongated supporting structure having a rearwardly located receiving station for input materials to be processed and a crushing station located forwardly thereof;
B. crushing apparatus at said crushing station, having an inlet in an upper portion and an outlet in a lower portion;
C. a delivery conveyor extending beneath the outlet of the crushing apparatus;
D. means for separating from the input materials those of main product size and for conducting the same to the delivery conveyor;
E. means for separating from the input materials those of larger than main product size and for conducting the same to the inlet of the crushing apparatus;
F. said material separating means comprising a vibratory material receiving unit having upper and lower screens of the same size mesh, and an imperforate deck at a level between said screens for advancing materials deposited thereon to a product delivery zone intermediate said unit and the crushing apparatus;
G. said means for conducting separated materials of main product size to the delivery conveyor comprising conveyor means mounted under the lower one of said screens to receive main product size material passing therethrough;
H. feed conveyor means arranged to discharge input materials to be processed separately onto said screens;
I. means for conducting carryover materials on said screens to the inlet of the crushing apparatus;
J. means mounted between the delivery conveyor and the outlet of the crushing apparatus for intercepting crushed material of larger than main product size issuing therefrom while allowing those of main product size to drop onto the delivery conveyor;
K. and means for returning such intercepted material to the inlet of the crushing apparatus.

30. An elongated crushing plant, characterized by:
A. a crushing device at a forward location, having an inlet at its top and an outlet at its bottom;
B. a delivery conveyor extending under the outlet of the crushing device;
C. an elevator wheel located rearwardly of the crushing device, to receive materials at a low level zone and to discharge said materials at a high level zone;
D. means for conducting to the inlet of the crushing device materials discharging at said high level zone of the elevator;
E. screen means located above the delivery conveyor and in position to intercept larger than main product size materials issuing from the outlet of the crushing device, for directing such intercepted materials to the low level inlet zone of the elevator wheel;
F. a receiving unit located rearwardly of the elevator wheel, having means comprising a vibratory screen on an upper portion thereof to receive input materials to be processed, and on which oversize input materials are vibrationally advanced forwardly to a discharge zone adjacent to the elevator wheel;
G. means to conduct such oversize materials from said discharge zone to the inlet of the crushing device along a path leading through the interior of the elevator wheel;
H. said receiving unit having means including a second vibratory screen below said first designated screen, to intercept larger than main product size materials but to pass and direct main product size materials to the delivery conveyor;
I. means for conducting such larger materials from said second screen forwardly to the low level inlet zone of the elevator wheel;
J. and an imperforate deck on the receiving unit at a level between said screens, to advance materials deposited thereon from the upper screen to a product delivery zone intermediate the receiving unit and the crushing device.

* * * * *